(12) United States Patent
Bailly et al.

(10) Patent No.: US 8,754,885 B1
(45) Date of Patent: Jun. 17, 2014

(54) STREET-LEVEL ZOOMING WITH ASYMMETRICAL FRUSTUM

(75) Inventors: Francois Bailly, Mountain View, CA (US); Gregory Coombe, San Francisco, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 13/421,291

(22) Filed: Mar. 15, 2012

(51) Int. Cl.
*G06T 15/00* (2011.01)
*G06F 3/048* (2013.01)

(52) U.S. Cl.
USPC .......................................... 345/419; 715/850

(58) Field of Classification Search
CPC ....... G06T 15/00; G06T 15/005; G06T 15/08; G06T 17/00; G06T 17/05; G06T 19/00; G06T 19/003; G06T 19/20
See application file for complete search history.

(56) References Cited

U.S. PATENT DOCUMENTS

| 2002/0122038 | A1* | 9/2002 | Cowperthwaite | 345/428 |
|---|---|---|---|---|
| 2008/0018732 | A1* | 1/2008 | Moller | 348/51 |
| 2008/0238916 | A1* | 10/2008 | Ghosh et al. | 345/419 |
| 2009/0256837 | A1* | 10/2009 | Deb et al. | 345/419 |
| 2011/0227913 | A1* | 9/2011 | Hyndman | 345/419 |
| 2012/0099804 | A1* | 4/2012 | Aguilera et al. | 382/285 |
| 2012/0223936 | A1* | 9/2012 | Aughey et al. | 345/419 |
| 2013/0207969 | A1* | 8/2013 | Louise et al. | 345/419 |

* cited by examiner

*Primary Examiner* — Carlos Perromat
*Assistant Examiner* — Nurun N Flora
(74) *Attorney, Agent, or Firm* — Dority & Manning, P.A.

(57) ABSTRACT

An exemplary method for navigating a virtual camera in a three dimensional environment includes determining a point at an off-center location of a viewport of the virtual camera. The point corresponds to a user selection, and the virtual camera defines a field of view to view content of the three dimensional environment. The method also includes rotating the virtual camera toward the off-center location such that the point is located at a center location of the viewport. The method further includes zooming the virtual camera toward the point located at the center location of the viewport. The method also includes after the zooming the virtual camera, re-rotating the virtual camera such that the point is located at the off-center location of the viewport. The method further includes after the re-rotating, rendering the content from a projection of the viewport.

21 Claims, 8 Drawing Sheets

STREET-LEVEL ZOOMING WITH ASYMMETRICAL FRUSTUM

FIELD

Embodiments generally relate to navigation in a three dimensional environment.

BACKGROUND

Systems exist for navigating through a three dimensional environment to display three dimensional data. The three dimensional environment includes a virtual camera that defines what three dimensional data to display. The virtual camera has a perspective according to its position and orientation. By changing the perspective of the virtual camera, a user can navigate through the three dimensional environment.

A geographic information system (GIS) uses a virtual camera to navigate through a three dimensional environment. A GIS is a system for storing, retrieving, manipulating, and displaying a three dimensional model of the Earth. The GIS may allow a user to navigate around a virtual globe and view satellite imagery, terrain, three dimensional buildings, and geo-spatial content in a geographic information environment at a display of a device.

A user may zoom into a location of the display using, for example, a mouse. When the user zooms into a point at an off-center location of the display, the displayed imagery may become distorted. This may create a non-satisfactory experience for the user.

BRIEF SUMMARY

Embodiments relate to navigating a virtual camera in a three dimensional environment. An exemplary method for navigating a virtual camera in a three dimensional environment includes determining a point at an off-center location of a viewport of the virtual camera. The point corresponds to a user selection, and the virtual camera defines a field of view to view content of the three dimensional environment. The method also includes rotating the virtual camera toward the off-center location such that the point is located at a center location of the viewport. The method further includes zooming the virtual camera toward the point located at the center location of the viewport. The method also includes after zooming the virtual camera, re-rotating the virtual camera such that the point is at the off-center location of the viewport. The method further includes after the re-rotating, rendering the content from a projection of the viewport.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Figure 1:
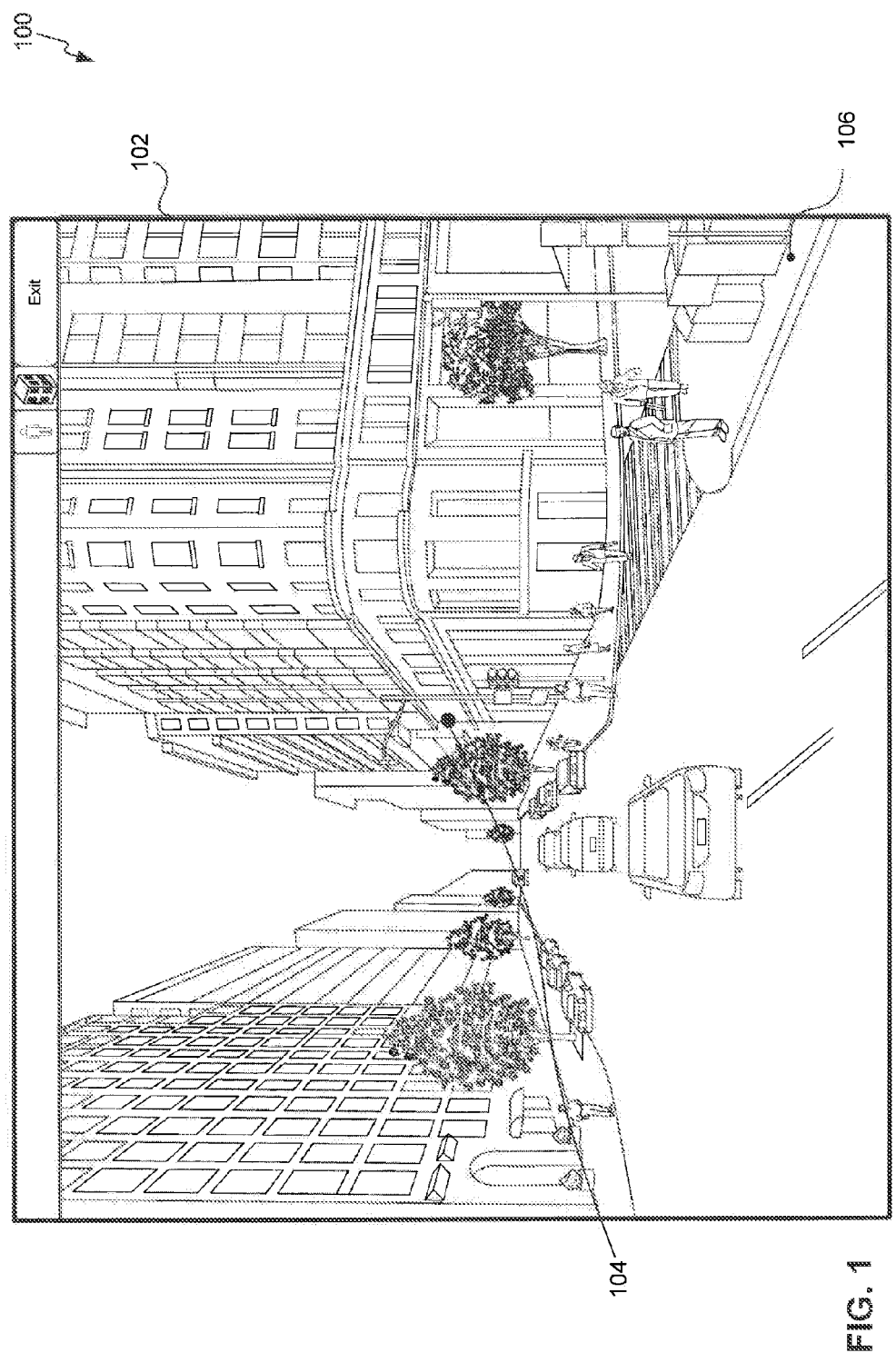
FIG. 1 is an illustration of a screenshot of a GIS user interface, according to an embodiment.

I. Overview
II. Navigate a Virtual Camera in a Three Dimensional Environment
  A. Display Area
  B. Symmetrical Frustum
  C. Asymmetrical Frustum
III. Zoom with Asymmetrical Frustum
  A. Rotate the Virtual Camera
  B. Zoom the Virtual Camera
  C. Re-rotate the Virtual Camera
  D. Render Content Representing Zoomed View
IV. Roll Compensation
V. Exemplary Client Architecture
VI. Exemplary Method
VII. Example Computer System

I. OVERVIEW

This description generally relates to enabling a user to zoom around an arbitrary point of a viewport of a virtual camera.

A user may select a point at an off-center location of the viewport to zoom around. In an embodiment, a point at an off-center location of a viewport of the virtual camera may be determined. The point corresponds to a user selection, and the virtual camera defines a field of view to view content of the three dimensional environment. The virtual camera may be rotated toward the off-center location such that the point is located at a center location of the viewport. The virtual camera may be zoomed toward the point located at the center location of the viewport. After the virtual camera is rotated, the virtual camera is re-rotated such that the point is located at the off-center location of the viewport. The content is rendered from a projection of the viewport such that the off-center location of the point is preserved on the viewport.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. NAVIGATE A VIRTUAL CAMERA IN A THREE DIMENSIONAL ENVIRONMENT

A. Display Area

A GIS may display geographic information in a three dimensional environment to a user from a perspective of a virtual camera.

FIG. 1 is an illustration of a screenshot of a GIS user interface 100, according to an embodiment. User interface 100 includes a display area 102 for displaying geographic information data. The user may view satellite imagery, terrain, three dimensional buildings, and geo-spatial content in a geographic information environment at a display of a device. Example geographic data displayed in display area 102 include images of buildings, trees, cars, and streets. These images may be rendered onto a geometry representing the Earth's terrain displaying a geographic information environment.

The user may zoom into a location on display area 102 by selecting the location with an input device. For example, the user may select a center location at center point 104 or an off-center location at off-center point 106 on display area 102. The user can select a location on display area 102 using, for example, a computer input device such as a pointing device (e.g., a mouse), a computer keyboard, or a joystick. Determining a point corresponding to a user selection is described in detail with respect to FIG. 2.

Figure 2:
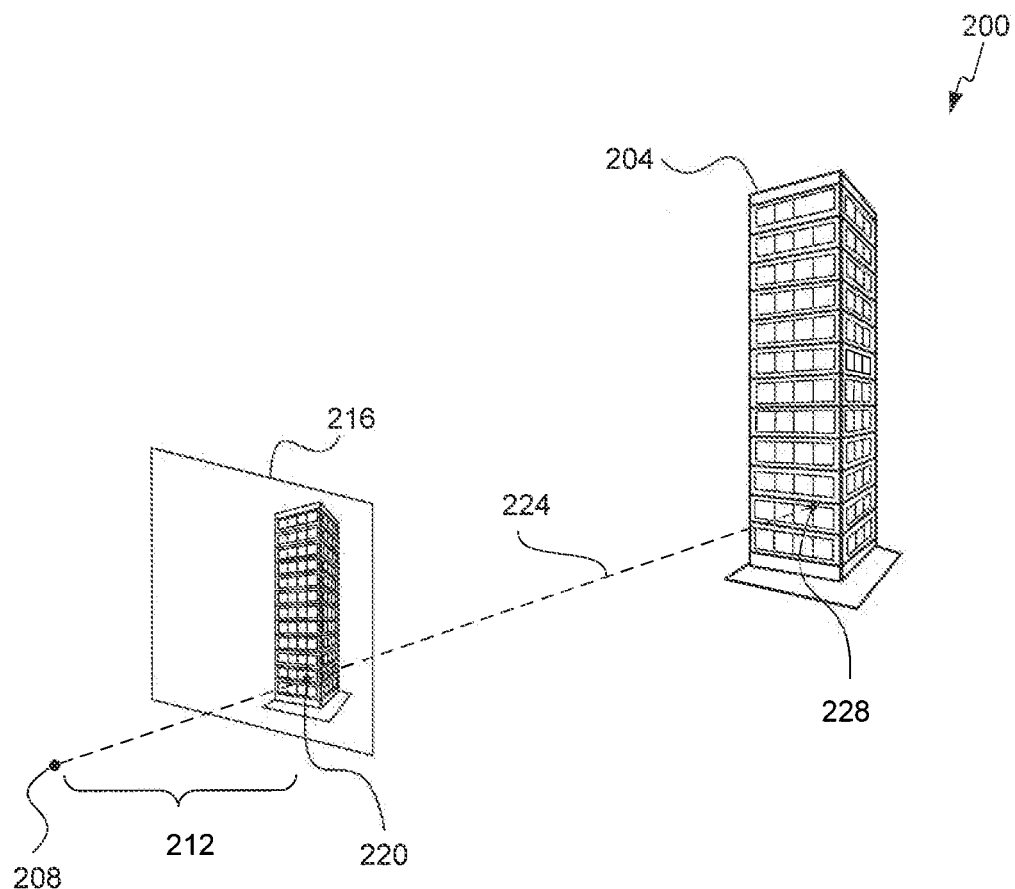
FIG. 2 is an illustration of a diagram including a three dimensional model of a building and a focal point of a virtual camera, according to an embodiment.

FIG. 2 is an illustration of a diagram 200 including a three dimensional model of a building 204 and a focal point 208 of a virtual camera, according to an embodiment. The virtual camera is used to capture and display information as described with respect to FIG. 1. The virtual camera has a focal length 212 and a viewport 216. Viewport 216 corresponds to display area 102 in FIG. 1. A user selects a location on display area 102, and the location corresponds to a point 220 on viewport 216.

A user may zoom into the three dimensional environment by selecting point 220 on viewport 216. A point at a location selected by the user may be determined by extending a screen ray from the virtual camera to determine an intersection with the model. In diagram 200, a ray 224 extends from focal point 208 through point 220 and intersects with model 204 at a location 228.

The data displayed in display area 102 is from the perspective of a virtual camera. In an embodiment, the perspective is defined by a frustum such as, for example, a three dimensional pyramid with the top sliced off. Geographic data within the frustum can be displayed at varying levels of detail depending on its distance from the virtual camera. As the virtual camera's perspective changes, the virtual camera's frustum and the geographic data displayed also change.

B. Symmetrical Frustum

Figure 3:
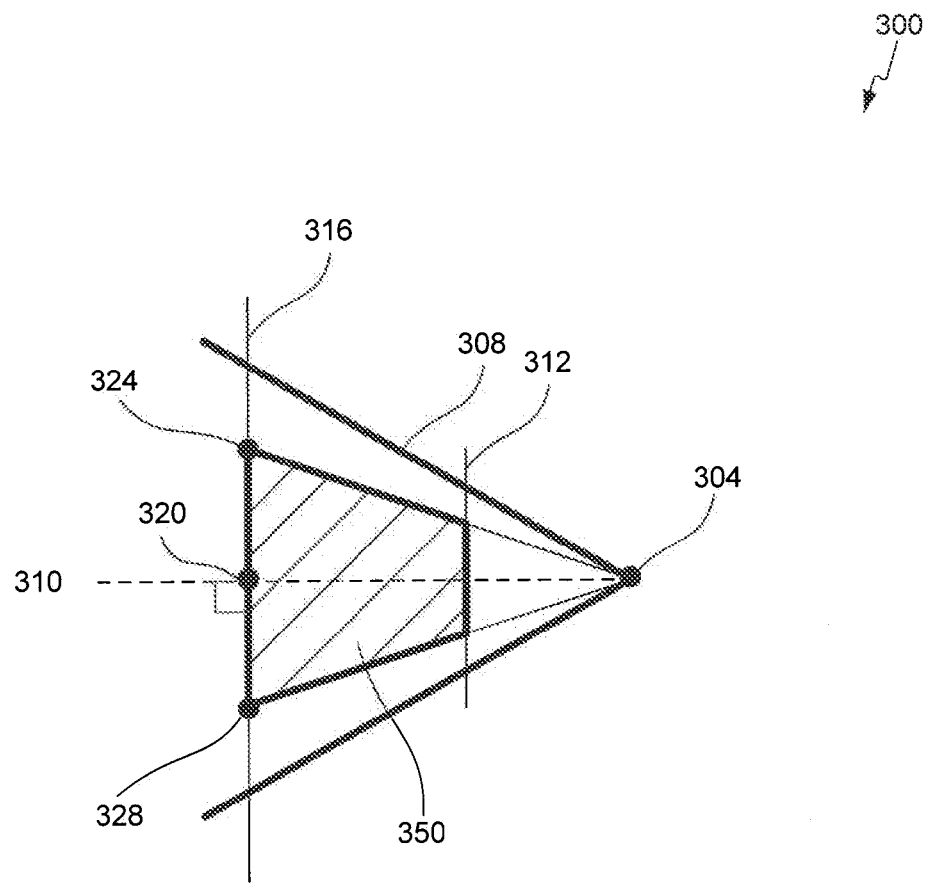
FIG. 3 is an illustration of a symmetrical viewing frustum, according to an embodiment.

FIG. 3 is an illustration 300 of a symmetrical viewing frustum, according to an embodiment. A virtual camera 304 defines a perspective to view content of the three dimensional environment and has an initial field of view 308 (indicated by the bold line segments extending from virtual camera 304). An initial symmetrical frustum extends from a near plane 312 to far plane 316 of field of view 308. A centerline 310 of the virtual camera extends from the virtual camera through a center of field of view 308.

A user may select a center point 104 located at a center of display area 102. For example, the user may select a center point 320 corresponding to an approximate center location of viewport 216 in FIG. 2, where viewport 216 corresponds to display area 102 and center point 320 corresponds to center point 104. Center point 320 is located at an approximate center of field of view 308 and the initial symmetrical frustum. When the user zooms around center point 320 by, for example, selecting a point of viewport 216 that corresponds to center point 320, the virtual camera's initial field of view is reduced.

Field of view 308 may be reduced by a same amount in both directions, resulting in a reduced field of view and a reduced symmetrical viewing frustum 350 (indicated by the bolded frustum and diagonal line segments). Centerline 310 of the virtual camera extends from the virtual camera through a center of reduced symmetrical viewing frustum 350. Center point 320 remains at the center in the reduced field of view, and a distance between a point 324 and virtual camera 304 is equidistant to a distance between a point 328 and virtual camera 304. Further, an angle between a line segment connecting virtual camera 304 to point 324 and a line segment connecting virtual camera 304 to point 320 is equal to an angle between a line segment connecting virtual camera 304 to point 320 and a line segment connecting virtual camera 304 to point 328.

After the user selected point is determined, the virtual camera is rotated toward center point 320 and the field of view is reduced. User selected center point 320 remains at the center of the reduced field of view. Once the field of view is reduced, the user may easily navigate around the three dimensional environment.

When the user zooms into center point 320, the pixels increase by the same amount in size. When the user zooms into a point at an off-center location of the viewport, however, the pixels located farther from the center elongate faster than pixels located approximately at the center of the viewport. Further, instead of the virtual camera having a symmetrical viewing frustum, the virtual camera has an asymmetrical viewing frustum and artifacts may be introduced that result in a disoriented image being displayed to the user.

C. Asymmetrical Frustum

Figure 4:
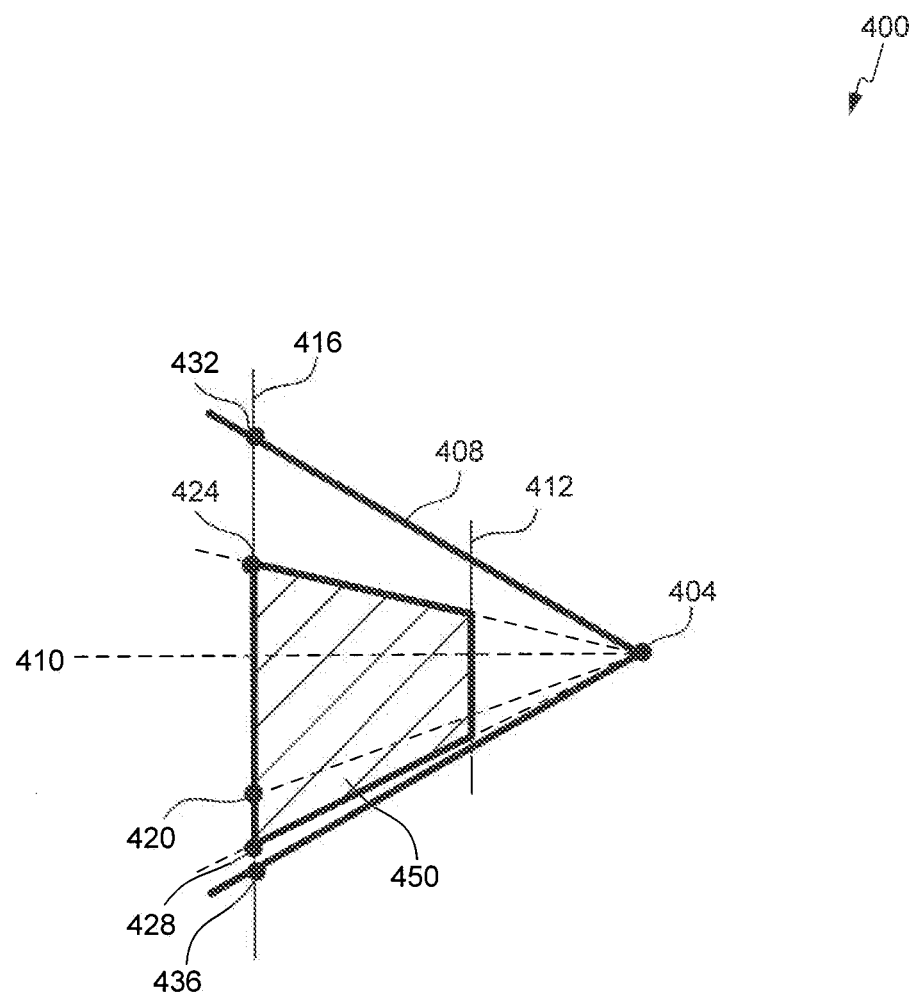
FIG. 4 is an illustration of an asymmetrical viewing frustum, according to an embodiment.

FIG. 4 is an illustration 400 of an asymmetrical viewing frustum, according to an embodiment. A virtual camera 404 defines a perspective to view content of the three dimensional environment and has an initial field of view 408 (indicated by the bold line segments extending from virtual camera 404). An initial symmetrical frustum extends from a near plane 412 to far plane 416 of field of view 408. A centerline 410 of the virtual camera extends from the virtual camera through a center of field of view 408.

A user may select an off-center point 106 located at an off-center location of display area 102. For example, the user may select an off-center point 420 corresponding to an off-center location of viewport 216 in FIG. 2, where viewport 216 corresponds to display area 102 and off-center point 420 corresponds to off-center point 106. Off-center point 420 is not located at a center of field of view 408 and is further not located at a center of the initial symmetrical frustum. When the user zooms around off-center point 420 by, for example, selecting a point of viewport 216 that corresponds to off-center point 420, the virtual camera's initial field of view is reduced.

Field of view 408 may be reduced by a different amount in both directions, resulting in a reduced field of view and an asymmetrical viewing frustum 450 (indicated by the bolded frustum and diagonal line segments). Centerline 410 of the virtual camera does not extend from the virtual camera through a center of reduced asymmetrical viewing frustum 450. Off-center point 420 is not at the center of the reduced field of view, and a distance between a point 424 and virtual camera 404 is different from a distance between a point 428 and virtual camera 404. Further, an angle between a line segment connecting virtual camera 404 to point 424 and a line segment connecting virtual camera 404 to point 420 is unequal to an angle between a line segment connecting virtual camera 404 to point 420 and a line segment connecting virtual camera 404 to point 428.

While keeping virtual camera in the same orientation, the field of view is reduced by a larger amount between points 432 and 424 compared to points 436 and 428. Similarly, the field of view is reduced by a fractional amount between points 436 and 428 compared to points 432 and 424.

In an example, after the field of view is reduced, a smaller portion of a three dimensional model in the three dimensional environment is displayed to a user compared to the original portion that was displayed to the user before the field of view was reduced. When the user pans the virtual camera in the three dimensional environment, however, the original center of the three dimensional model that is orthogonal to the Earth is no longer at the center. Accordingly, rather than centerline 410 of the virtual camera being in the center of the reduced field of view (e.g., in FIG. 3), centerline 410 is off center in the reduced field of view.

When the virtual camera's viewable volume within the three dimensional space is an asymmetrical frustum, rotating the virtual camera may result in distorted imagery being displayed to the user. For example, when the user attempts to zoom in on a point at an off-center location of the viewport, one part of the image may zoom by faster than another part. This may be disorienting to the user because the user may expect the view to move uniformly.

The techniques provided in this disclosure reduce the disorientation resulting from zooming into a point at an off-center location and maintaining the point at its initial off-center location of the viewport for rendering.

III. ZOOM WITH ASYMMETRICAL FRUSTUM

A. Rotate the Virtual Camera

Figure 5:
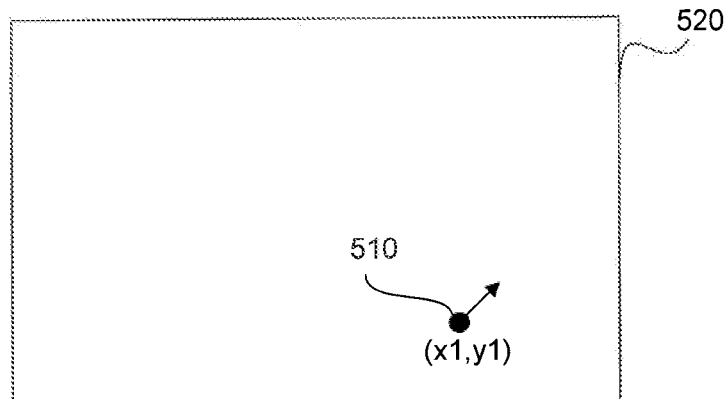
FIG. 5 is an illustration of a point at an off-center location of a viewport of a virtual camera, according to an embodiment

FIG. 5 is an illustration of a point 510 at an off-center location (x, y) of a viewport 520 of a virtual camera, according to an embodiment. A user may zoom into point 510 by selecting a location (x, y) of viewport 520.

In an embodiment, point 510 at an off-center location of a viewport of a virtual camera can be determined. Point 510 may correspond to a user selection. After point 510 is determined, the virtual camera may be rotated toward the off-center location such that the point (e.g., the point under a mouse cursor) is located at a center location of the viewport.

Figure 6:
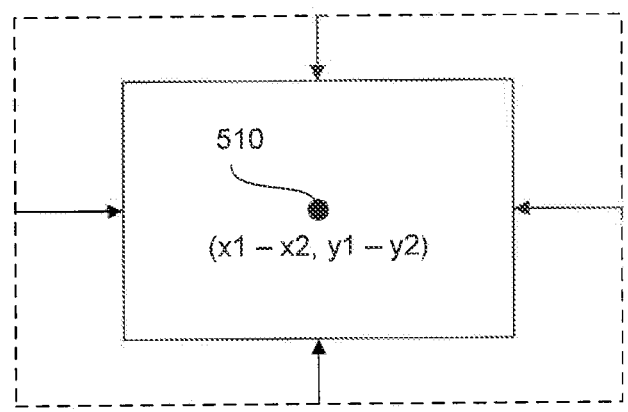
FIG. 6 is an illustration of a point located at a center location of the viewport after the virtual camera is rotated, according to an embodiment.

FIG. 6 is an illustration of point 510 located at a center location of the viewport after the virtual camera is rotated, according to an embodiment. After rotating the virtual camera, point 510 is at a center location of the viewport.

In an embodiment, rotating the virtual camera may include modifying an orientation of the virtual camera based on a location of the point.

B. Zoom the Virtual Camera

After point 510 is located at the center location of the viewport, the virtual camera may be zoomed in toward point 510. The virtual camera may be zoomed in by the amount requested by the user. For example, if a user desires to zoom in 100 percent (twice the area), the virtual camera may be rotated about fifty percent toward the user selected point.

In an embodiment, the virtual camera is rotated and zoomed toward the point simultaneously, substantially at the same time, or in a parallel manner. In an example, the following two steps occur simultaneously, substantially at the same time, or in a parallel manner:

1. The virtual camera is rotated such that a point at an off-center location selected by the user is centered around the point, and 2. The virtual camera is zoomed toward the point.

Zooming the virtual camera toward point 510 may include reducing the field of view of the virtual camera and may also include uniformly scaling the viewport. The viewport may be scaled uniformly about the viewport's center.

When the virtual camera is rotated and zoomed toward point 510, a location of point 510 may not be preserved on the viewport. For example, in FIG. 5, point 510 is located at off-center location (x1, y1). When the viewport is uniformly scaled about the viewport's center such as in FIG. 6, point 510 moves from off-center location (x1, y1) in FIG. 5 to location (x1-x2, y1-y2) in FIG. 6. Location (x1-x2, y1-y2) may be an approximate center location of the viewport. Locations (x1, y1) and (x1-x2, y1-y2) are different locations and represent different angles and views of a virtual camera in a three dimensional environment.

C. Re-Rotate the Virtual Camera

After zooming the virtual camera, the virtual camera may be re-rotated such that point 510 is located at the initial off-center location (x1, y1) of the viewport. The virtual camera may be re-rotated back toward the initial center such that point 510 is at the same relative location (x1, y1) on the viewport.

Figure 7:
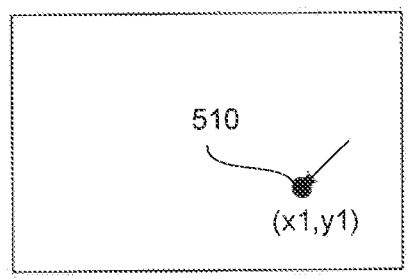
FIG. 7 is an illustration of a point at its initial off-center location of the viewport after the virtual camera is re-rotated, according to an embodiment.

FIG. 7 is an illustration of point 510 at its initial off-center location (x, y) of the viewport after the virtual camera is re-rotated, according to an embodiment.

As a result of rotating the virtual camera toward an off-center location such that the point is located at a center location of the viewport and zooming into the point, re-rotating the virtual camera such that the point is located at its initial off-center location may not simply be the inverse of the first rotation.

D. Render Content Representing Zoomed View

In an embodiment, a frame is rendered to a user after the virtual camera is rotated toward an off-center location of a user selected point such that the point is located at a center location of the viewport, zoomed toward the point located at the center, and re-rotated such that the point is located at the initial off-center location.

A single frame may be rendered including the above three operations applied to the virtual camera rather than rendering the intermediate frames. For example, the rotation, zoom, and re-rotation of the virtual camera may be performed in a single frame interval. In this way, the new camera parameters may be determined without rendering the intermediate frames. For example, three different flames may have different modifications of the virtual camera but are not rendered to the user. Consequently, the user may experience a smooth transition as the virtual camera zooms into the user selected point. In particular, the user may have the experience of a smooth continuous zoom around the point even though multiple steps occurred in the background before the frame was rendered.

IV. ROLL COMPENSATION

If the initial view has no roll and the virtual camera is rotated and zoomed exactly the inverse of the previous rotation (e.g., the opposite angle of the rotation), then the resulting view may not introduce roll. If the second rotation of the virtual camera (e.g., re-rotation) is not the inverse of the first rotation, however, then the resulting view may introduce roll.

Rotating, zooming, and re-rotating the virtual camera about the user selected point may introduce roll, a view where the horizontal plane is no longer horizontal in the three dimensional view. For example, in a rolled view, the natural horizontal plane is not the horizontal plane of the three dimensional model (e.g., Earth) after the re-rotation. When the virtual camera is rotated toward a point at an off-center location such that the point is located at a center of the viewport and the virtual camera is zoomed around the point, the rotation axis is vertical. When the virtual camera is re-rotated such that the point is located at the initial off-center location of the viewport, the exact same angle may not be applied to the virtual camera because the view has been zoomed in. When the camera is re-rotated, the user selected point is not directly on the horizontal line and the non-aligned horizontal planes of the views may introduce roll. Further, the verticals of the two different views are not aligned. Roll may be disorienting to a user.

Roll is more pronounced when a location of the point at which the user is attempting to zoom around is far from a center of the viewport (e.g., in the corner of the viewport). Points located farther from the center are farther off from the axes as a result of the camera rotations. For example, if a user selects a point located near a corner of the viewport, the first rotation that rotates the virtual camera toward the corner point may be fairly large. When the virtual camera zooms toward the corner point, the virtual camera is tilted and is farther off from the horizontal plane.

Without roll compensation, a user may see the virtual camera shifting sideways (e.g., left or right). Roll compensation may be applied to unshift the horizontal plane. For example, after the re-rotation, roll compensation may be applied to maintain the point at its initial off-center location. An unrolled view may be computed while maintaining a location of the selected point on a display.

In an embodiment, the virtual camera is at a given position and is not moved, the field of view of the virtual camera is defined and is not changed, and the original point chosen by the user projects to the same location on the screen. The resulting view may be unrolled by applying a rotation to the model view matrix. This may result in modifying the virtual camera's orientation.

In an embodiment, a decomposition of a view of the virtual camera's right vector r along the axis and its normal plane satisfies an equation:

$$r = r_A + r_N, \quad (1)$$

where r is the virtual camera's normalized right vector (pointed exactly to the right of the vector), and where A is the axis between the virtual camera position and the point on the screen.

View transformations may be limited to rotations around axis A to keep the axis in the same position. In this way, the position of the desired point may be maintained on the screen.

In an embodiment, unrolling a right vector satisfies an equation:

$$R(r) = r_A + R(r_N), \quad (2)$$

where R is a rotation along the axis A.

In Equation (2), the rotation may not affect the component along the axis.

In an embodiment, if U and V are an orthonormal basis in the plane normal to A, any vector in that plane can be expressed as a linear combination of U and V. For example, a vector in that plane may satisfy an equation:

$$R(r_N) = \alpha U + \beta V, \quad (3)$$

It may be desirable to build a rotated right vector that is orthogonal to P and therefore fully lies in the horizontal plane, where P is a position of the virtual camera (e.g., vector from origin of planet to camera). The dot symbol (e.g., "·") in the equations represents a dot product operation.

In an embodiment, a rotated right vector that is orthogonal to P satisfies an equation:

$$R(r) \cdot P = r_A \cdot P + \alpha U \cdot P + \beta V \cdot P, \quad (4)$$

Because either U or V may be selected, it may be desirable to select the one that is non-rolled, if possible. Based on this, U·P=0 therefore, solving for R(r)·P=0, satisfies an equation:

$$0 = r_A \cdot P + \beta V \cdot P, \quad (5)$$

Using Equations (3) and (5) yields:

$$\beta = -\frac{r_A \cdot P}{V \cdot P} \quad (6)$$

The two coefficients may have a constraint that the rotated right vector has a same norm as the original right vector. Accordingly, it follows that $\alpha^2 = \beta^2 = r_N^2$, which satisfies an equation:

$$\alpha^2 = r_N^2 - \beta^2, \quad (7)$$

In Equation (7), if case $\beta^2 > r_N^2$, there are no real values of $\alpha$ that work and the problem has no solution. Accordingly, the chosen axis may have only a limited action on the right vector (e.g., the angle between the two vectors is too low).

Otherwise, if $\beta^2 \leq r_N^2$ at least one value of a produces an unrolled right vector. If there are two solutions, the two views that are produced are inverted from each other. A non-inverted view may be selected (with an up vector pointing away from the planet, e.g., has a positive dot product with the position vector).

It may be desirable to determine two vectors U and V that form an orthonormal basis of the plane orthogonal to A with the added condition that U should be horizontal (e.g., P·U=0).

For example, let $U_0 = A \times P$ (where × denotes the cross product). If A and P are not collinear, $U_0$ has a non-zero norm that can be normalized.

In an embodiment, vector U satisfies an equation:

$$U = \frac{U_0}{|U_0|}, \qquad (8)$$

where U has a norm of 1 and is orthogonal to both A and P. In a further embodiment, vector V satisfies an equation:

$$V = A \times U, \qquad (9),$$

where v is orthogonal to A and completes the orthonormal basis (A, U, V).

Otherwise, $U_0$ zero and there is no solution to the problem.

Geometrically, A and P being collinear may mean that the axis is perfectly vertical. Because any rotation around that axis has zero effect on roll, an unrolled view may not be introduced around such an axis.

V. EXEMPLARY CLIENT ARCHITECTURE

Figure 8:
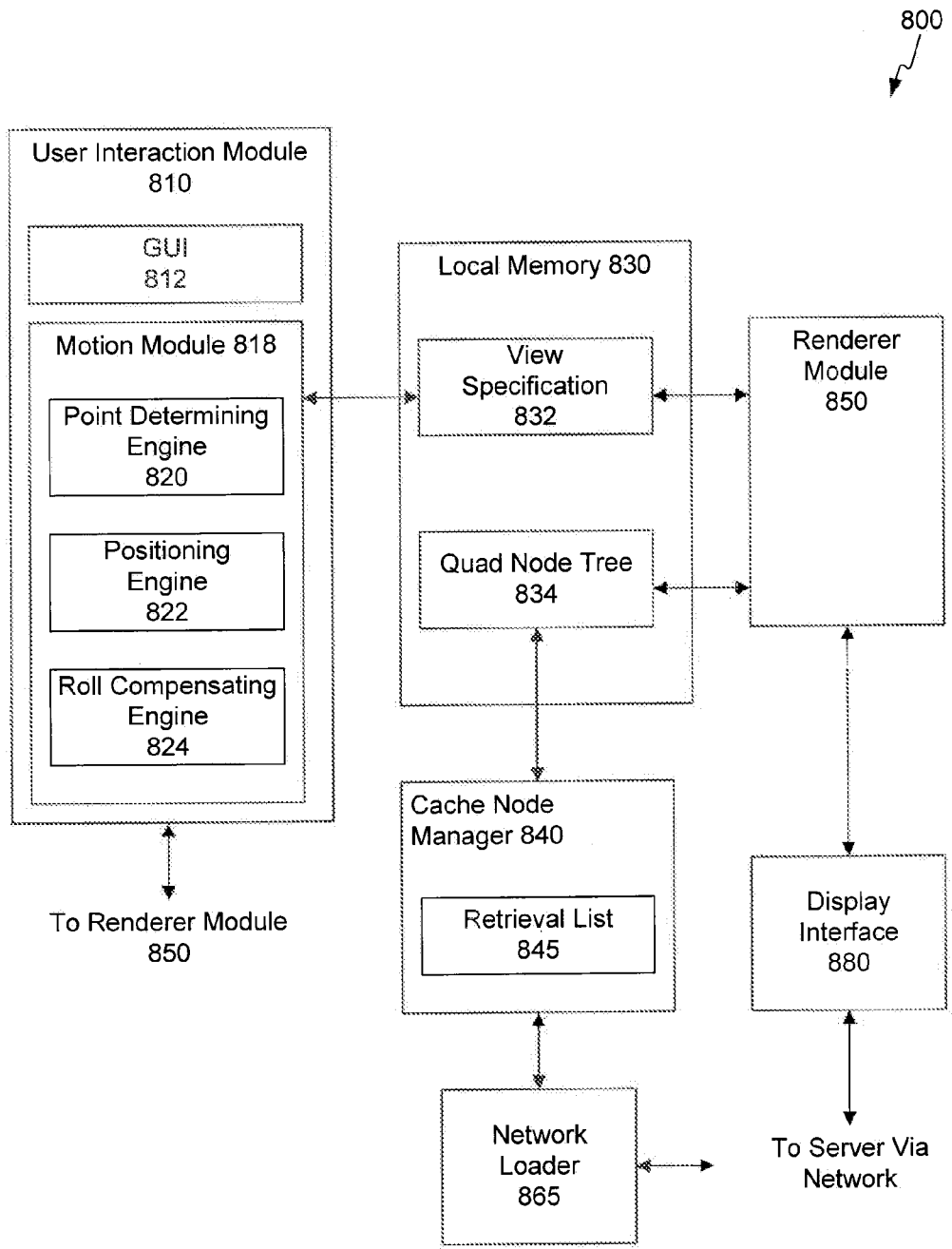
FIG. 8 is an illustration of an architecture diagram of an exemplary client of a GIS, according to an embodiment.

FIG. 8 is an illustration of an architecture diagram of an exemplary client 800 of a GIS, according to an embodiment. In an embodiment, client 800 includes a user interaction module 810, local memory 830, cache node manager 840, renderer module 850, network loader 865, and display interface 880.

In an embodiment, the components of client 800 can be implemented, for example, as software running on a client machine. Client 800 interacts with a GIS server (not shown) to bring images of the Earth and other geospatial data to client 800 for viewing by a user. Together, the images of the Earth and other geospatial data form a three dimensional model in a three dimensional environment. In an embodiment, software objects are grouped according to functions that can run asynchronously (e.g., time independently) from one another.

A user interaction module 810 includes a graphical user interface (GUI) 812 and motion module 818. A local memory 830 includes a view specification 832 and quad node tree 834. Cache node manager 840 includes a retrieval list 845.

In general, client 800 operates as follows. User interaction module 810 receives user input regarding a location that a user desires to view and, through motion module 818, constructs view specification 832. A renderer module 850 uses view specification 832 to decide what data is to be drawn and draws the data. Cache node manager 840 runs in an asynchronous thread of control and builds quad node tree 834 by populating it with quad nodes retrieved from a remote server via a network.

In an embodiment of user interface module 810, a user inputs location information using GUI 812. This results, for example, in the generation of view specification 832. The location information may be a location of the point that the user desires to zoom around.

Motion module 818 uses location information received via GUI 812 to adjust the position or orientation of a virtual camera. The camera is used, for example, for viewing a displayed three dimensional model of the Earth. A user sees a displayed three dimensional model on his or her computer monitor from the standpoint of the virtual camera. In an embodiment, motion module 818 also determines view specification 832 based on the position of the virtual camera, the orientation of the virtual camera, and the horizontal and vertical fields of view of the virtual camera.

Motion module 818 may adjust a virtual camera based on a user desiring to zoom around an arbitrary point on the screen and renders content from a projection of a viewport of the virtual camera. In an embodiment, a viewable volume of the virtual camera within the three dimensional environment is a symmetrical frustum. In another embodiment, a viewable volume of the virtual camera within the three dimensional environment is an asymmetrical frustum.

In an embodiment, motion module 818 includes a point determining engine 820, positioning engine 822, and a roll compensating engine 824. Point determining engine 820 determines a point at an off-center location of a viewport of the virtual camera. The point corresponds to a user selection. For example, the user may input location information using GUI 812. The virtual camera defines a field of view to view content of the three dimensional environment.

Positioning engine 822 rotates the virtual camera toward the off-center location such that the point is located at a center location of the viewport. Rotating the virtual camera may include modifying an orientation of the virtual camera.

Positioning engine 822 zooms the virtual camera toward the point located at the center location of the viewport. Zooming the virtual camera may include reducing the field of view of the virtual camera and may also include uniformly scaling the viewport. In an embodiment, positioning engine 822 rotates and zooms the virtual camera simultaneously, substantially at the same time, or in a parallel manner. In another embodiment, positioning engine 822 rotates the virtual camera, zooms the virtual camera, and re-rotates the virtual camera in the same frame interval.

After rotating and zooming the virtual camera, positioning engine 822 re-rotates the virtual camera such that the point is located at the off-center location of the viewport.

Roll compensating engine 824 unrolls a view while preserving the position of a point on the viewport (e.g., the point the user clicked on). Roll compensating engine 824 may modify an orientation of the virtual camera based on the off-center location of the viewport while maintaining the point at the off-center location of the viewport. In an embodiment, roll compensating engine 824 determines a rotated right vector of the virtual camera that is orthogonal to a position of the virtual camera, where the rotated right vector fully lies in a horizontal plane of the viewport. Roll compensating engine may use the Equations described in this disclosure to unroll the view.

View specification 832 defines the virtual camera's viewable volume within a three dimensional space, known as a frustum (e.g., a symmetrical or asymmetrical frustum), and the position and orientation of the frustum with respect, for example, to a three dimensional map. In an embodiment, the frustum is in the shape of a truncated pyramid. The frustum has minimum and maximum view distances that can change depending on the viewing circumstances. As a user's view of a three dimensional map is manipulated using GUI 812, the orientation and position of the frustum changes with respect to the three dimensional map. Thus, as user input is received, view specification 832 changes. View specification 832 is placed in local memory 830, where it is used by renderer module 850.

In an embodiment, renderer module 850 reads view specification 832 that has been placed by motion module 818 in a data structure accessed by a renderer. Renderer module 850 renders the content in the three dimensional environment from a projection of the viewport. Renderer 850 may display a single frame that includes the modifications resulting from rotating, zooming, and re-rotating the virtual camera such that the intermediate frames are not displayed to a user. If roll compensating engine 824 unrolls a view, renderer 850 may display a single frame after motion module 818 rotates, zooms, and re-rotates the virtual camera and roll compensating engine 824 unrolls the view.

The cache node manager 840 thread builds quad node tree 834 in local memory 830 by populating it with quad nodes retrieved from GIS server(s). Retrieval list 845 includes a list of information identifying cache nodes to be downloaded from a GIS server. In each network loader 865 thread, a network loader traverses cache node retrieval list 845 (which in the embodiment shown in FIG. 8 is included in cache node manager 840, but can also be located in other places, such as the local memory 830 or other storage facility) and requests the next cache node from the GIS server(s) using the cache node's filename.

Display interface 880 (e.g., a display interface card) is configured to allow data from a mapping module to be sent to a display associated with the user's computer, so that the user can view the data. Display interface 880 can be implemented with conventional technology.

VI. EXEMPLARY METHOD

Figure 9:
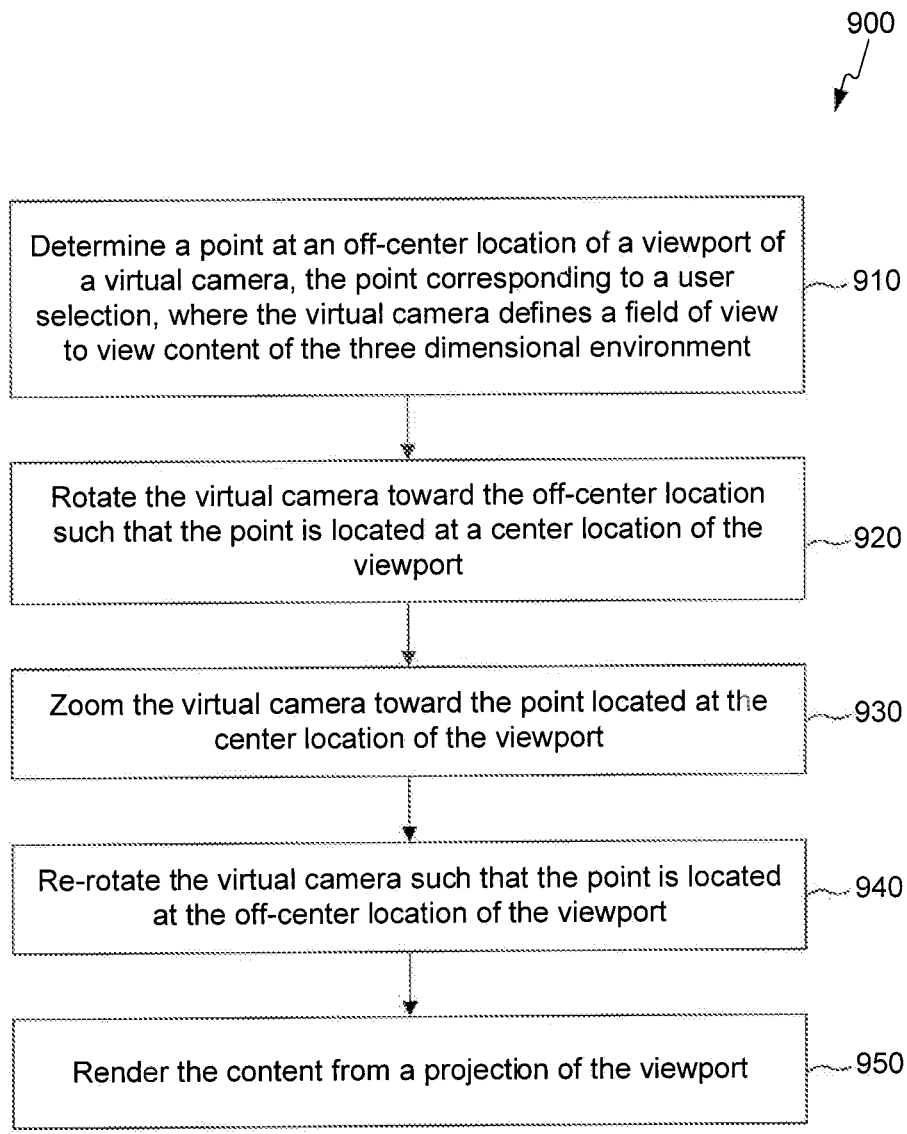
FIG. 9 is an illustration of a flowchart of an exemplary method for navigating a virtual camera in a three dimensional environment, according to an embodiment.

FIG. 9 is an illustration of a flowchart of an exemplary method 900 for navigating a virtual camera in a three dimensional environment, according to an embodiment. Method 900 may be used in operation of client 800 in FIG. 8. Although method 900 is described with respect to client 900, it is not meant to be limited to client 900.

At step 910, a point at an off-center location of a viewport of the virtual camera is determined. The point corresponds to a user selection, and the virtual camera defines a field of view to view content of the three dimensional environment. In an example, point determining engine 820 determines a point at an off-center location of a viewport of the virtual camera, where the point corresponding to a user selection and the virtual camera defines a field of view to view content of the three dimensional environment.

At step 920, the virtual camera is rotated toward the off-center location such that the point is located at a center location of the viewport. In an example, positioning engine 822 rotates the virtual camera toward the off-center location such that the point is located at a center location of the viewport.

At step 930, the virtual camera is zoomed toward the point located at the center location of the viewport. In an example, positioning engine 822 zooms the virtual camera toward the point located at the center location of the viewport.

At step 940, the virtual camera is re-rotated such that the point is located at the off-center location of the viewport. In an example, positioning engine 822 re-rotates the virtual camera such that the point is located at the off-center location of the viewport. The re-rotation is performed after the virtual camera is rotated and zoomed toward the point.

At step 950, the content is rendered from a projection of the viewport. In an example, renderer module 850 renders the content from a projection of the viewport.

VII. EXAMPLE COMPUTER SYSTEM

Figure 10:
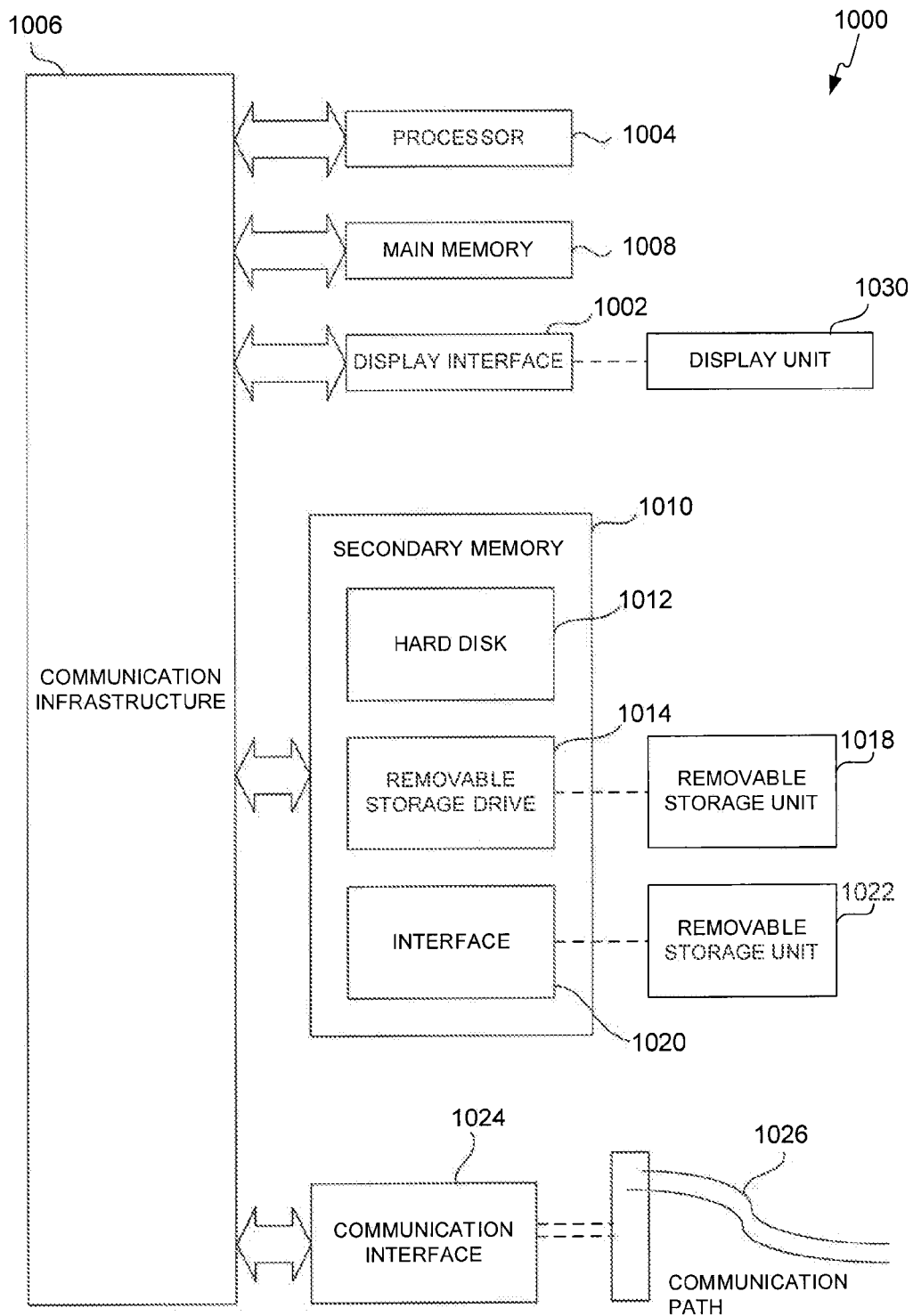
FIG. 10 is an illustration of an example computer system in which embodiments may be implemented as computer-readable code.

FIG. 10 is an illustration of an example computer system 1000 in which embodiments may be implemented as computer-readable code. For example, exemplary client 800 may be implemented in computer system 1000 using hardware, software, firmware, tangible computer readable media having instructions stored thereon, or a combination thereof and may be implemented in one or more computer systems or other processing systems. Hardware, software, or any combination of such may embody any of the modules and components in FIG. 8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1000. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general-purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement embodiments as discussed herein. In particular, the computer programs, when executed, enable processor device 1004 to implement the processes, such as the stages in the method illustrated by flowchart 900 of FIG. 9 discussed above. Accordingly, such computer programs represent controllers of the computer system 1000. Where embodiments are implemented using software, the software may be stored in a computer program product and loaded into computer system 1000 using removable storage drive 1014, interface 1020, and hard disk drive 1012, or communications interface 1024.

Embodiments also may be directed to computer program products including software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The summary and abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A computer-implemented method for navigating a virtual camera in a three dimensional environment, comprising:
   receiving, by one or more computing devices, data describing a user input, the user input requesting to zoom around a point of a viewport of the virtual camera, wherein the point has an off-center location with respect to the viewport; and
   in response to the user input requesting to zoom around the point at the off-center location, performing, by the one or more computing devices, operations within a single frame interval, the operations comprising:
   (a) determining, by the one or more computing devices, the point at the off-center location of the viewport of the virtual camera, wherein the virtual camera defines a field of view to view content of the three dimensional environment;
   (b) rotating, by the one or more computing devices, the virtual camera toward the off-center location such that the point is located at a center location of the viewport;
   (c) zooming, by the one or more computing devices, the virtual camera toward the point located at the center location of the viewport;
   (d) after zooming the virtual camera, re-rotating, by the one or more computing devices, the virtual camera such that the point is located at the off-center location of the viewport; and
   (e) after the re-rotating, rendering, by the one or more computing devices, the content from a projection of the viewport.

2. The method of claim 1, wherein a viewable volume of the virtual camera within the three dimensional environment is an asymmetrical frustum.

3. The method of claim 1, wherein the zooming (c) comprises reducing, by the one or more computing devices, the field of view of the virtual camera and uniformly scaling the viewport.

4. The method of claim 1, wherein the rotating (b) and the zooming (c) occur simultaneously, substantially at the same time, or in a parallel manner.

5. The method of claim 1, wherein the operations further comprise:
(f) modifying, by the one or more computing devices, an orientation of the virtual camera based on the off-center location of the viewport to reduce roll, wherein the modifying maintains the point at the off-center location of the viewport.

6. The method of claim 5, wherein the modifying (f) comprises:
(g) determining, by the one or more computing devices, a rotated right vector of the virtual camera that is orthogonal to a position of the virtual camera, wherein the rotated right vector fully lies in a horizontal plane of the viewport.

7. The method of claim 6, wherein the operations further comprise unrolling the right vector of the virtual camera, wherein a value that produces an unrolled right vector substantially satisfies an equation:

$$\alpha^2 r_N^2 - \beta^2$$

wherein β is a co-efficient that substantially satisfies an equation $$\beta = -\frac{r_A \cdot P}{V \cdot P},$$

wherein P is a position of the virtual camera,
wherein $r_A$, is the viewport's right vector along an axis between the virtual camera position and the point of the viewport, and
wherein V is an orthonormal basis in the plane normal to the axis between the virtual camera position and the point of the viewport, and
wherein $r_N$ is the viewport's right vector along its normal plane.

8. The method of claim 1, wherein the operations further comprise:
(f) after the re-rotating but prior to the rendering, rotating, by the one or more computing devices, a model view matrix about a first axis to reduce roll, the first axis being defined between a position of the virtual camera and the point, wherein the rotating about the first axis maintains the point at the off-center location of the viewport.

9. The method of claim 1, wherein the re-rotating (d) is not the inverse of the rotating (b).

10. A system for navigating a virtual camera in a three dimensional environment, comprising:
a user interaction module configured to receive data describing a user input, the user input requesting to zoom around a point of the virtual camera, wherein point has an off-center location with respect to the viewport
a point determining engine configured to determine the point at the off-center location of the viewport of the virtual camera, wherein the virtual camera defines a field of view to view content of the three dimensional environment;
a positioning engine configured to, within a single frame interval;
rotate the virtual camera toward the off-center location such that the point is located at a center location of the viewport;
zoom the virtual camera toward the point located at the center location of the viewport; and
re-rotate the virtual camera such that the point is located at the off-center location of the viewport; and
a renderer configured to render the content from a projection of the viewport;
wherein the point determining engine, the positioning engine, and the renderer operate in response to the user input requesting to zoom around the point at the off-center location.

11. The system of claim 10, wherein a viewable volume of the virtual camera within the three dimensional environment is an asymmetrical frustum.

12. The system of claim 10, wherein when the positioning engine zooms the virtual camera, the positioning engine is configured to reduce the field of view of the virtual camera and uniformly scale the viewport.

13. The system of claim 10, wherein the positioning engine is configured to modify an orientation of the virtual camera based on the off-center location of the viewport to reduce roll, and when the positioning engine modifies the orientation of the virtual camera, the positioning engine is configured to maintain the point at the off-center location of the viewpoint.

14. The system of claim 10, wherein the positioning engine is configured to determine a rotated right vector of the virtual camera that is orthogonal to a position of the virtual camera, wherein the rotated right vector fully lies in a horizontal plane of the viewport.

15. The system of claim 14, wherein the positioning engine is configured to unroll the right vector of the virtual camera, wherein a value that produces an unrolled right vector substantially satisfies an equation:

$$\alpha^2 = r_N^2 - \beta^2$$

wherein β is a co-efficient that substantially satisfies an equation $$\beta = -\frac{r_A \cdot P}{V \cdot P},$$

wherein P is a position of the virtual camera,
wherein $r_A$, is the viewport's right vector along an axis between the virtual camera position and the point of the viewport, and
wherein V is an orthonormal basis in the plane normal to the axis between the virtual camera position and the point of the viewport, and
wherein $r_N$ is the viewport's right vector along its normal plane.

16. The system of claim 10, further comprising:
a roll compensating engine configured to rotate a model view matrix about a first axis to reduce roll, the first axis being defined between a position of the virtual camera and the point, wherein the rotating about the first axis maintains the point at the off-center location of the viewport;
wherein the roll compensating engine operates in response to the user input requesting to zoom around the point at the off-center location.

17. A non-transitory computer readable storage medium encoded with a computer program, the program comprising instructions that when executed by one or more processors cause the one or more processors to perform operations comprising:

receiving data describing a user input, the user input requesting to zoom around a point of a viewport of a virtual camera, wherein the point has an off-center location with respect to the viewport; and in response to the user input requesting to zoom around the point at the of the center location, performing, within a single frame interval, additional operations, the additional operations comprising:

(a) determining the point at the off-center location of the viewport of the virtual camera, wherein the virtual camera defines a field of view to view content of a three dimensional environment;

(b) rotating the virtual camera toward the off-center location such that the point is located at a center location of the viewport;

(c) zooming the virtual camera toward the point located at the center location of the viewport;

(d) after rotating the virtual camera, re-rotating the virtual camera such that the point is located at the off center location of the viewport; and (e) after the re-rotating, rendering the content from a projection of the viewport.

18. The non-transitory computer readable storage medium of claim 17, wherein a viewable volume of the virtual camera within the three dimensional environment is an asymmetrical frustum.

19. The non-transitory computer readable storage medium of claim 17, wherein the program comprising instructions that when executed by one or more processors cause the one or more processors to perform operations comprising zooming the virtual camera toward the point located at the center location of the viewport further causes the one or more processors to perform operations comprising reducing the field of view of the virtual camera and uniformly scaling the viewport.

20. The non-transitory computer readable medium of claim 17, the additional operations further comprising:

(f) modifying an orientation of the virtual camera based on the off-center location of the viewport to reduce roll, wherein the modifying maintains the point at the off center location of the viewport.

21. The non-transitory computer readable storage medium of claim 17, the additional operations further comprising (f) after the re-rotating but prior to the rendering, rotating a model view matrix about a first axis to reduce roll, the first axis being defined between a position of the virtual camera and the point, wherein the rotating about the first axis maintains the point at the off-center location of the viewport.

* * * * *

UNITED STATES PATENT AND TRADEMARK OFFICE
CERTIFICATE OF CORRECTION

PATENT NO. : 8,754,885 B1  
APPLICATION NO. : 13/421291  
DATED : June 17, 2014  
INVENTOR(S) : Bailly et al.

Page 1 of 1

It is certified that error appears in the above-identified patent and that said Letters Patent is hereby corrected as shown below:

In The Claims

Column 15, After Line 25, please delete "$\alpha^2 rn^2-\beta^2$" and insert --$\alpha^2=rn^2-\beta^2$--

Column 15, Line 59, after word "around", please delete "a point of the virtual camera, wherein point" and insert --a point of a viewpoint of the virtual camera, wherein the point--

Column 15, Line 67, after word "interval", please delete ";" and insert --:--

Signed and Sealed this  
Ninth Day of August, 2016

Michelle K. Lee  
*Director of the United States Patent and Trademark Office*